Oct. 6, 1931.    F. W. WEHMANN ET AL    1,826,376
MACHINE FOR STRIPPING TOBACCO LEAVES
Filed April 9, 1928    5 Sheets-Sheet 5
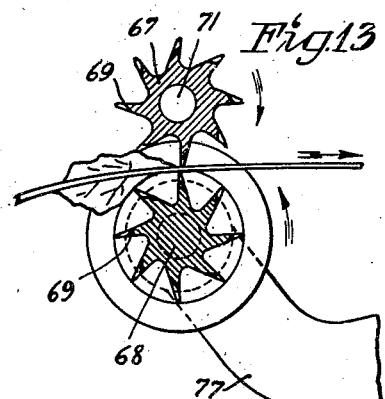
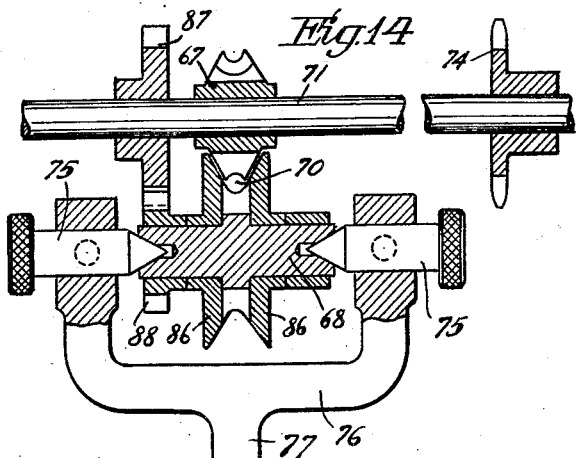
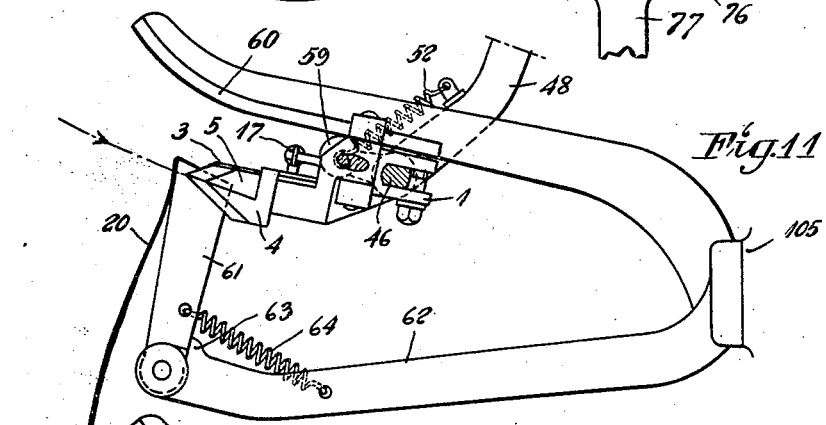
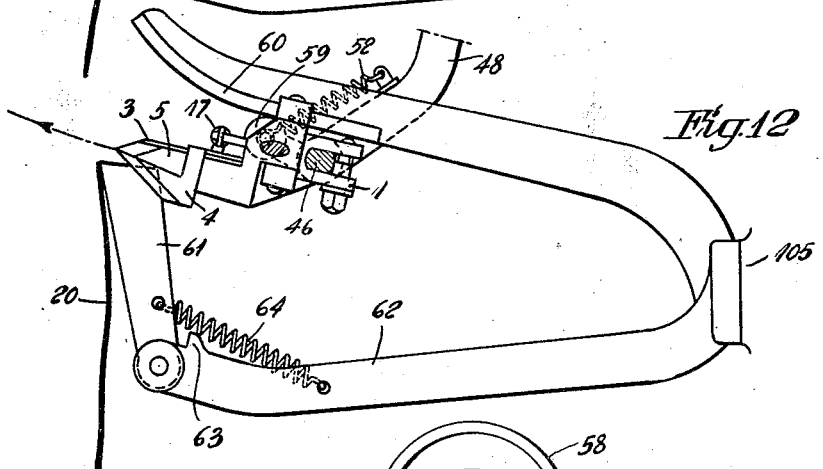
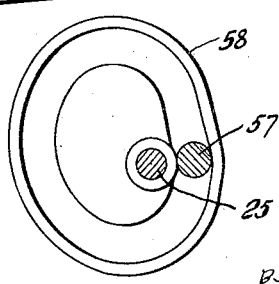
F. W. Wehmann
E. R. Dahlstrom
INVENTORS Patented Oct. 6, 1931

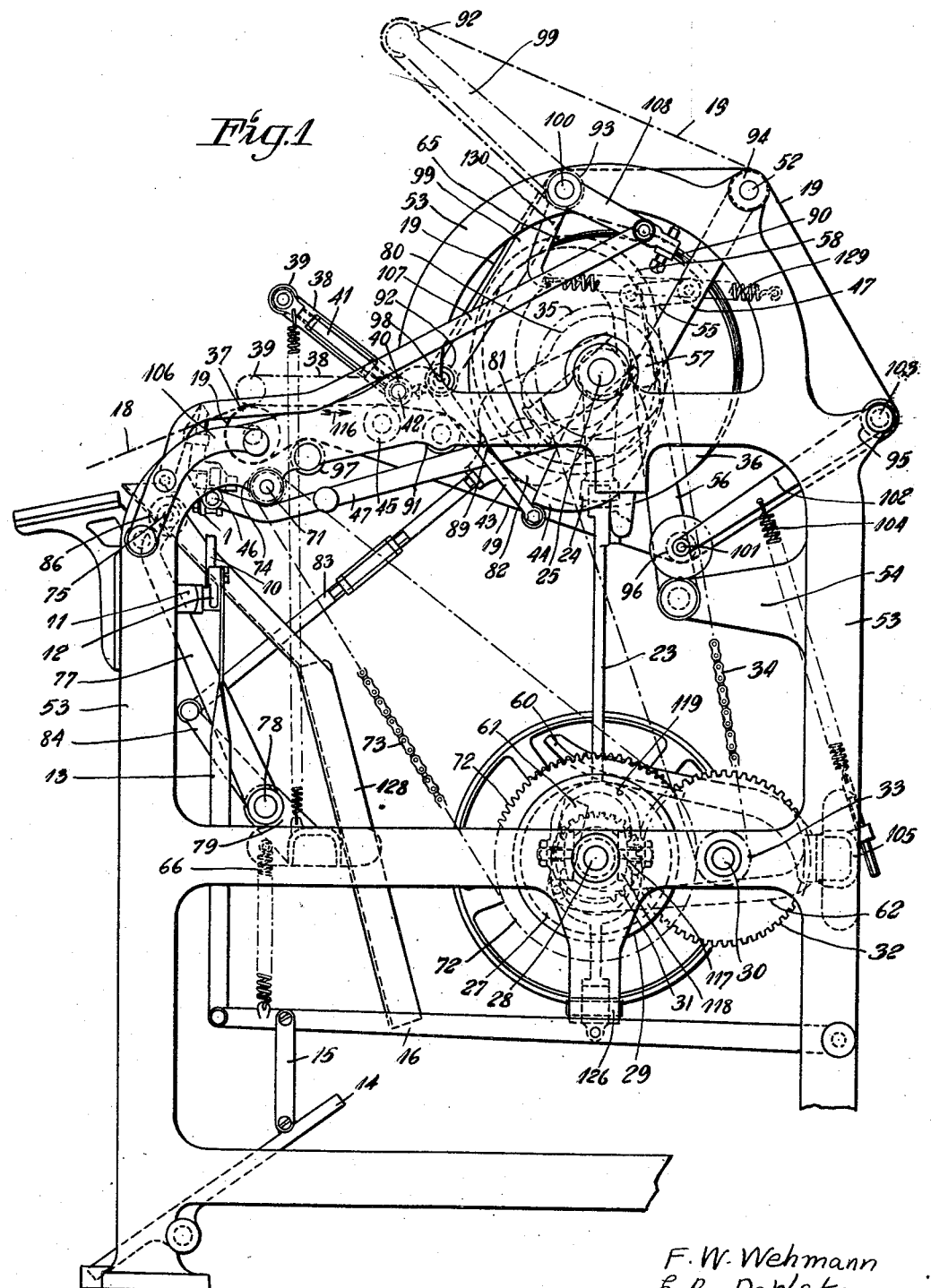

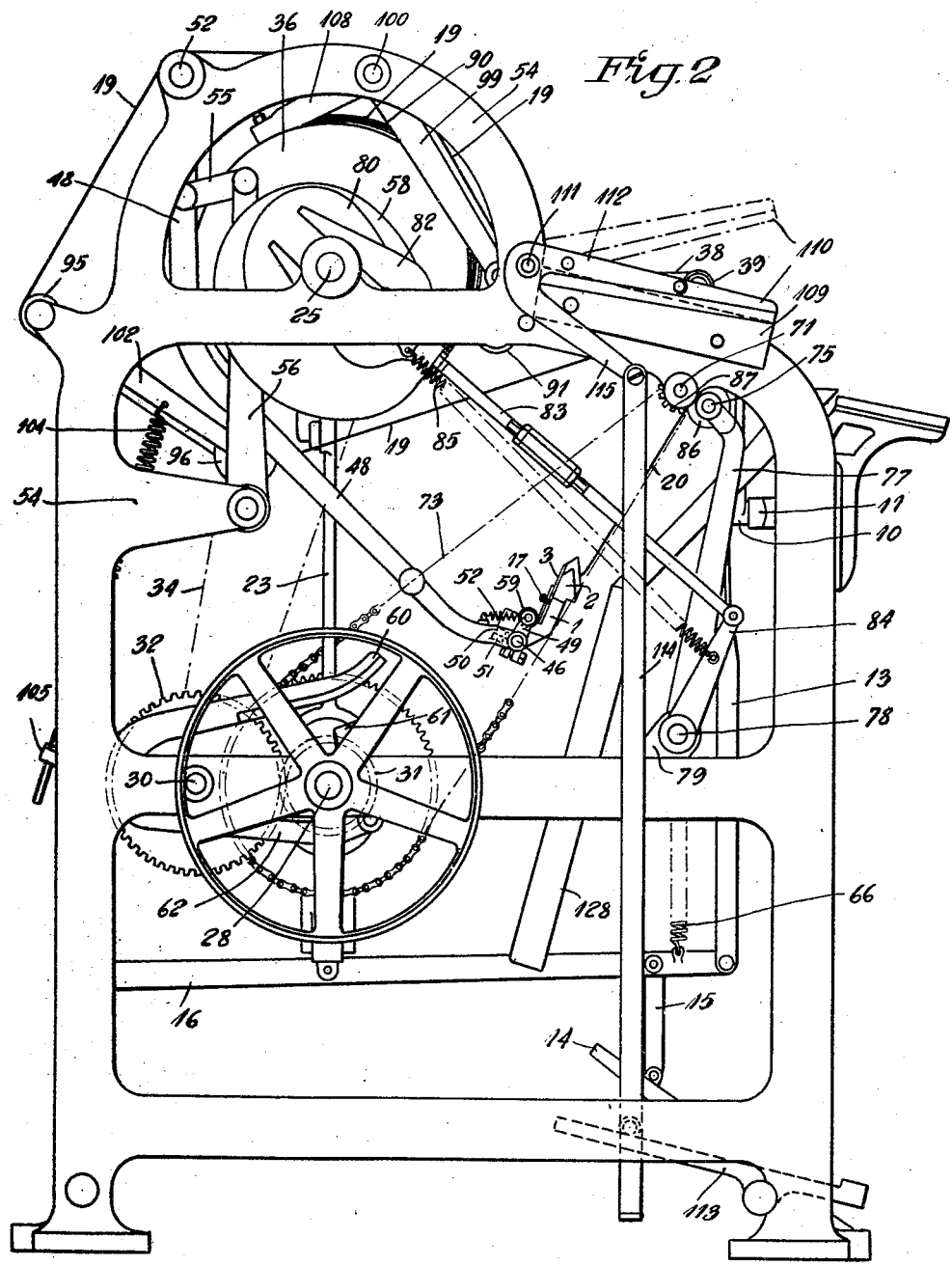

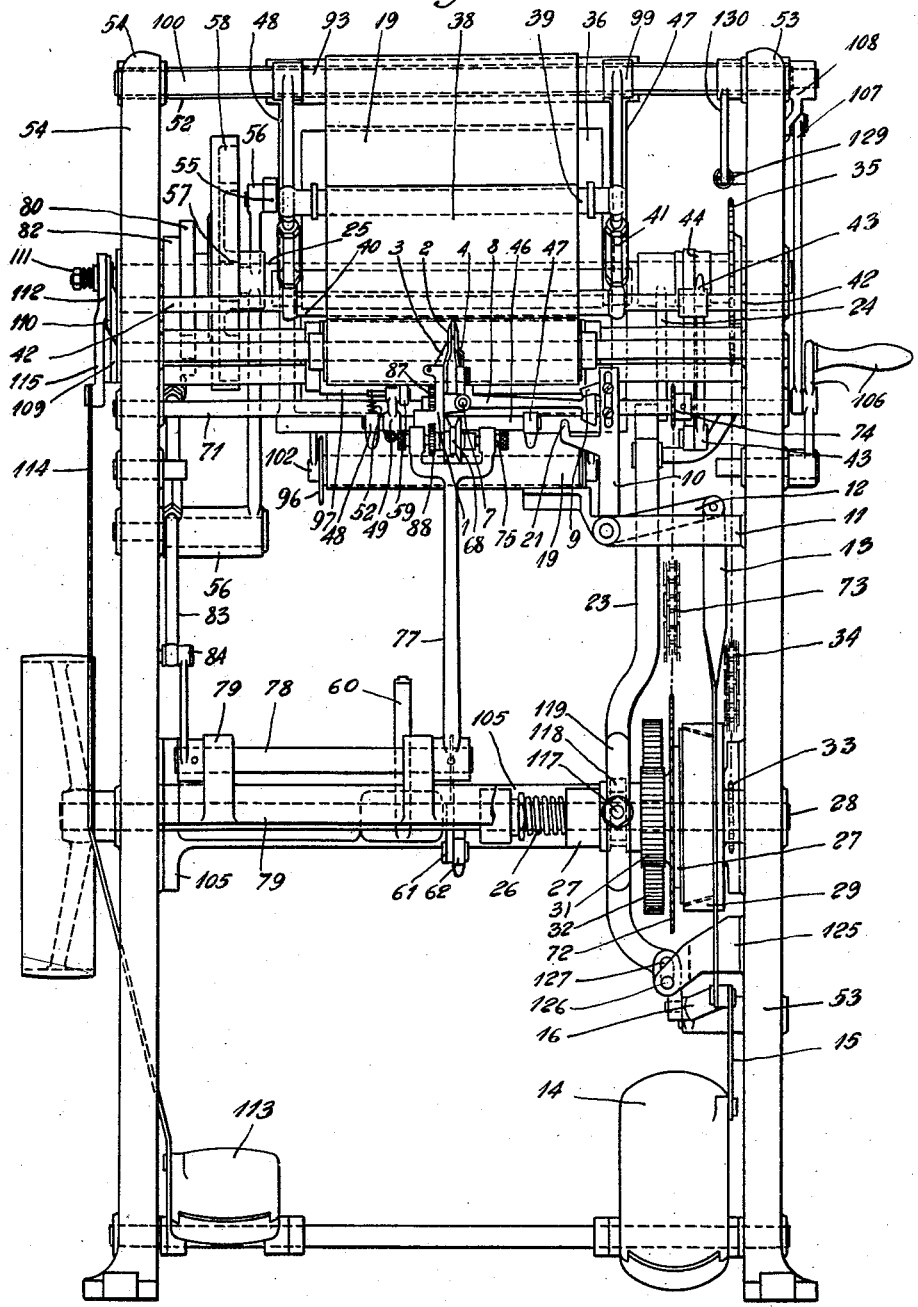

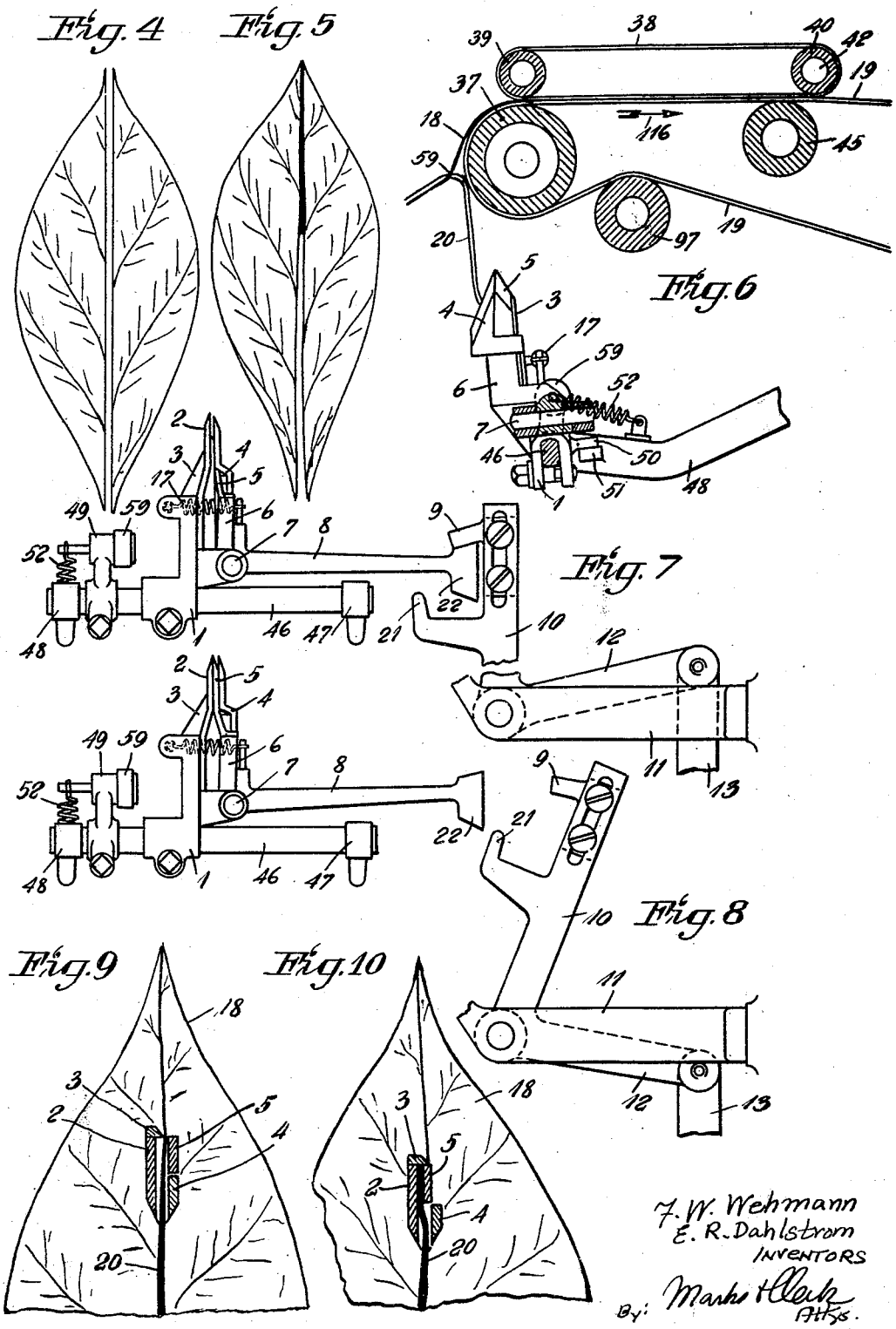

1,826,376

UNITED STATES PATENT OFFICE

FRIEDRICH WILHELM WEHMANN, OF STOCKHOLM, AND ERNST RUBEN DAHLSTRÖM, OF ALSTEN, SWEDEN, ASSIGNORS TO AKTIEBOLAGET FORMATOR, OF STOCKHOLM, SWEDEN, A CORPORATION OF SWEDEN

MACHINE FOR STRIPPING TOBACCO LEAVES

Application filed April 9, 1928, Serial No. 268,685, and in Germany April 29, 1927.

The present invention refers to machines for the stripping of tobacco leaves of the type provided with a gripper or the like by means of which the stem of the leaves is gripped at some distance from the point of the leaf, whereupon the gripper and the leaf are given a suitable movement in relation to each other. This stripping is generally called half-stripping. However, in order to enable whole stripping of wrappers, binders and the like, there is provided a shearing device in the machine, which is to be described more fully hereinbelow, and which shearing device makes it possible to divide the leaves (the book) into two halves, the same as in machines where the stem is cut out in its entirety (whole-stripping). Thus the present machine, which is primarily intended for the stripping of filler tobacco, for which purpose no machine has been previously devised, may also replace machines for whole-stripping, the machine thus becoming universal.

The invention is illustrated in the accompanying drawings. Fig. 1 shows the machine in starting position viewed from the right hand side, the left treadle having been omitted. Fig. 2 shows the machine viewed from the left hand side, the gripper moving downwards. Fig. 3 shows the machine in starting position viewed from the front. Fig. 4 shows a leaf entirely stripped by cutting out the stem. Fig. 5 shows a leaf half-stripped by tearing. Fig. 6 shows how the stem is torn from the leaf in the process of stripping. Fig. 7 shows the gripper and adjacent parts viewed from the front in the starting position of the machine when the gripper is open. Fig. 8 shows the gripper and adjacent parts viewed from the front, the gripper being closed and the other parts assuming corresponding positions. Fig. 9 shows a tobacco leaf to an enlarged scale and threaded onto the gripper the shanks of which have penetrated the leaf and are located one on each side of the stem. Fig. 10 shows the tobacco leaf after the gripper has been closed and after a knife connected with the shank of the gripper has severed the stem. Fig. 11 illustrates how the stem is picked out of the gripper in the lower limit position of the latter. Fig. 12 illustrates how the stem is prevented from being carried with the gripper in the upward movement of the latter into the starting position. Fig. 13 shows in vertical section and in elevation a device for cleaning the stripped stem from leaf portions sticking thereto. Fig. 14 shows the same device in horizontal section and in plan view. Fig. 15 shows a detail.

1 designates the holder of the gripper, from which holder extend three shanks (Figs. 6–10) 2, 4, 5, shank 2 being situated on the one side of the stem and shanks 4 and 5 on the other side thereof when the leaf is threaded on the gripper. The shanks 2 and 4 as well as the knife 3 serving to sever the stem trasversely are rigidly connected with the holder 1, whereas the shank 5 is secured on a holder 6 which is rotatably arranged about the shaft 7 rigidly connected with the holder 1, that is to say, the shank 5 is turnable in relation to the shanks 2 and 4.

The tobacco leaf 18 (the point of which is directed inwardly) is moved down over (threaded on) the gripper by the operator when the gripper assumes the position shown in Figs. 1, 3, 7 and 9, the gripper being open in this position. The machine is then at rest.

In this open position, the gripper is held against the action of the spring 17, an arm 8 rigidly connected with the holder 6 engaging underneath a bolt 9 which is adjustably secured on the arm 10 of a bell crank lever which arm is pivotally attached to the support 11, the other arm 12 of the bell crank lever being pivotally connected with the pulling rod 13. This rod is connected with the treadle 14 by means of the arm 16 and the link 15 pivotally secured to the frame of the machine (Figs. 1 and 3).

After the tobacco leaf has been threaded onto the gripper, said leaf then extending with its front portion over the endless band 19 described more fully hereinbelow, the treadle 14 is actuated, the bolt 9 then releasing the arm 8 so that the gripper will be closed, the shank 5 moving toward the shank 2 (Figs. 8 and 10) through the influence of the spring 17 and the stem 20 being severed by the knife 3 at the edge of the shank 5 adjacent to the point of the leaf and at a point situated at a certain distance from the point of the leaf. To ensure that the stem shall be severed should the power of the spring 17 be insufficient, there is an abutment 21 on the arm 10, said abutment 21 being moved against the abutment 22 on the arm 8 so as to force the shanks of the gripper together on the continued actuation of the treadle. This is taking place immediately before the bell crank lever 10, 12 has reached the position shown in Fig. 8. When the gripper is open, the shanks 4 and 5 (Figs. 6 and 9) together form one shank of the same width as that of shank 2, so that the leaf is cut up to the same extent on both sides of the stem (Fig. 9) when being threaded over the gripper. It is only the portion of the stem located right opposite the shank 5 which is gripped by the gripper when the latter is closed (Fig. 10), as will be readily understood from the above, in that the portion of the stem which has been cut off by the shank 4 and the corresponding part of the shank 2 is left free. The last mentioned cutting operation gives an indication for the further tearing off of the stem, so that the leaf will not break outwardly toward the sides.

On continued depressing of the treadle 14 the machine is started as will be understood from the description hereinbelow. When the arm 16 (Figs. 1 and 3) movably connected with the treadle 14 is moved downwards, a coupling rod 23, which is vertically arranged and pivotally connected at its lower end to the arm 16, is moved vertically downwards, until the upper part of the coupling rod 23 ceases to bear on an arm 24 which is attached to the shaft 25 for the booking drum 36 mounted in the frame of the machine. The coupling rod 23 is provided with a strap-shaped member 119 embracing the hub of the coupling disk 27 which is formed as a friction disk and is loosely mounted on the shaft 28, said coupling disk 27 cooperating with the coupling disk 29 made in the form of a friction disk and secured on the same shaft as the coupling disk 27. Two screw bolts 117 threaded one into each of the lateral members of the strap 119 extend with their inner unthreaded ends into guide pieces 118 engaging into a circumferentially extending groove in the hub of the coupling disk 27.

A support 125 of the machine frame is provided with a pin 126 engaging a vertical slot 127 in the coupling rod 23. Thus the downward movement of the treadle ceases when the upper edge of the slot hits the pin 126. As soon as the treadle has reached its lower limit position the machine has been started, so that the booking drum moves one revolution. Thus the treadle may be released immediately after it has reached the lower limit position.

In the position shown in Figs. 1 and 3, the disk 27 is kept out of engagement with the disk 29 against the action of the coupling spring 26 provided on the driving shaft 28, on account of the locking of the coupling rod 23 through the arm 24. Now, when this locking ceases, as stated hereinbefore, the coupling spring 26 (Fig. 3) moves the friction disk 27 into engagement with the friction disk 29 secured on the driving shaft 28 (which is driven by means of a suitable motor). The movement is transmitted onto an intermediate shaft 30 (Fig. 1) mounted in the frame through the toothed wheel 31 attached to the disk 27 and the toothed wheel 32 on the shaft 30 and, further, through the sprocket wheel 33, the chain 34 and the sprocket wheel 35 to the shaft 25 of the drum. The endless band 19 running over the drum 36, which is secured on the shaft 25, for which band there is provided a break roller 37 near and behind the starting position of the gripper, will then obtain a movement in the direction of the arrow 116 (Fig. 1), that is the part of the band extending rearwards (inwardly) from the upper side of the break roller to the drum 36 moves rearwards (inwardly). Together with the band 19 an endless band 38 serves as a carrying member for the tobacco leaf, said band 38 extending about the rollers 39 and 40. The roller 39 is mounted in two arms 41 (Fig. 1) attached to the shaft 42 of the other roller 40. A further arm 43 is secured on this shaft, said arm cooperating with a cam disk 44 attached to the shaft 25, so that the roller 39 and the band 38 are moved alternately up and down. The band 38 receives its movement about its break rollers by the roller 40 (Fig. 6) and, in lowered position, also the band 38 bearing on the band 19 and a break roller 45 for the latter.

Immediately after the machine has been started, that is to say, after the coupling has been engaged, the roller 39 and the band 38 are moved from the raised position shown with full lines in Fig. 1, down toward the band 19 (Fig. 1, the position shown by chain-dotted lines, and Fig. 6), the front portion (point) of the tobacco leaf 18 which has been resting on the band 19, being then caught by the bands 19 and 38, so that the leaf is brought into movement toward the drum 36, that is to say, into the booking device.

The movement of the gripper for tearing the stem out of the leaf is obtained in the following manner:

The holder 1 of the gripper (Figs. 1, 6–8) is secured on the shaft 46 which is rotatably mounted in the arms 47 and 48. Attached to the arm 46 is an arm 49 bearing with an abutment 50 (Fig. 2) against an abutment 51 on the arm 48 under the action of the spring 52, the gripper thus obtaining the upright position shown in Figs. 1, 3, 7 and 8. The arms 47 and 48 are secured on the shaft 52

(Figs. 1–3) which is movably mounted in the two lateral members 53 and 54 of the frame. The arm 48 is movably connected with the arm 56 through a link 55, said arm 56 being rotatably mounted in the frame member 54. A roller 57 mounted in the arm 56 engages a slot in a cam disk 58 (Fig. 15) which is secured on the shaft 25. When the machine is started, the gripper obtains a movement corresponding to the shape of the slot in the cam disk 58, said movement being so adapted that the gripper will, while the feeding of the leaf 18 into the machine commences, be lowered, the gripper entraining the stem 20 (Fig. 2) and leaving the passage for the leaf free. The movement of the gripper thereafter is such in relation to the feeding movement of the bands that the place of stripping 59 (Fig. 6) or the point where the stem 20 leaves the leaf 18, will always be situated adjacent to the band 19 opposite the front side of the roller 37, or, at any rate, in the proximity thereof.

When the stem has been torn out in its entirety and the gripper approaches its lower position of reversal, a roller 59 on the arm 49 (Figs. 2, 3, 11 and 12) moves against the fixed guide bar 60 in the frame, so that the gripper is turned as shown in Fig. 11, the spring 52 being strained thereby. The gripper then moves with the shanks 2 and 5 one on each side of a picker 61 formed as a lamina or the like, said picker having a scraping action on the inner side of the gripper and thus picking off the stem 20, whereupon the latter falls down along a groove 128 into a box (not shown). In order to prevent the gripper from catching the stem on its point in case the stem 20 should happen to stick to the point of the picker 61 (Fig. 12), the picker is pivotally mounted on an arm 62 secured in the frame. Normally, the picker abuts against an abutment 63 on this arm through the influence of a spring 64, but when the gripper turns and commences to move upwards, the picker will, on account of the pressure of the shanks on the same, turn forwards about its pivot, whereby the point thereof is brought further down than the point of the gripper, as shown in Fig. 12, so that the latter is not then brought into contact with the stem to grip the same anew.

While the stem is being torn out of the tobacco leaf, the latter continues to move with the band 19 about the booking drum 36 so far that the leaf is brought with its front portion onto 65 (Fig. 1), the machine being then automatically caused to stop if the pressure on the treadle 14 has ceased, the coupling rod 23 being raised through the spring 66 and the arm 16 into the position according to Fig. 1, so that the arm 24 on the drum shaft 25 will again displace the rod 23 in the longitudinal direction of the driving shaft against the influence of the spring 26, when the revolution has been completed, the friction coupling on the driving shaft 28 being thus disengaged. The gripper has now been returned into its upper position, whereas the roller 39 and the band 38 have been raised through the influence of the cam disk 44 into the position shown in full lines in Fig. 1. Immediately before the gripper reaches the said upper position, the arm 8 on the holder 6 hits the bolt 9 on the bell crank lever 10, whereby the gripper is opened and the spring 17 is strained (Figs. 1 and 9). In order to remove leaf portions from the stem which may be carried with the latter when the leaves are very torn, a cleaning device is provided according to the invention. This device consists of two cutter wheels 67 and 68 provided with teeth 69 (Figs. 13 and 14). The cutter teeth 69 are of such a shape that a round opening 70 (Fig. 14) will be produced between two teeth, one on each wheel, when these teeth are adjacent to each other. The stem is permitted to pass through this opening while being still held by the gripper. The inner wheel 67 is attached to the shaft 71 (Fig. 1) which is rotatably mounted in the frame members 53 and 54 and is driven from the shaft 28 by means of the sprocket wheel 72 secured on the friction disk 27, the chain 73, and the sprocket wheel 74 attached to the shaft 71. The outer or front wheel 68 (Fig. 14) is mounted on two studs 75 inserted one in each shank of a fork 76 forming the outer end of an arm 77 (Figs. 1–3) which is secured on a shaft 78 rotatably mounted in the frame brace 79. The arm 77 receives an oscillatory swinging motion from the cam disk 80 attached to the drum shaft 25, the said cam disk cooperating with a fork 82 provided with a roller 81, said fork being secured on a rod 83 pivotally connected with the arm 84 attached to the shaft 78. The roller 81 bears on the cam disk 80 through the influence of the spring 85 (Fig. 2). When the machine is at rest, the arm 77 with the outer wheel 68 assumes the position shown in Fig. 1. After the machine has been started, the wheel 68 begins to approach the wheel 69, so that the two wheels 68 and 69 will embrace the stem altogether, immediately above the point of the gripper, when the latter has been sufficiently lowered. In order to guide the stem more readily in between the wheels, there are secured two conical disks 86 on the hub of the outer wheel 68, said conical disks 86 forming a deep groove together with the wheel for the purpose of catching the stem. On the shaft 71 for the inner wheel rotating in a clockwise direction is attached a toothed wheel 87, and on the hub of the wheel 68 a corresponding toothed wheel 88. These toothed wheels mesh into each other when the wheel 68 is approached to the wheel 67, whereby wheel 68 is caused to rotate in a counter-clockwise direction.

Now, the teeth of both cutter wheels work against the stem in a direction opposed to that of the movement of the stem, the cutter wheels thus together effecting a thorough removal of leaf portions sticking to the stem. The cleaning is continued until the whole stem has passed between the wheels, the arm 77 being then returned into starting position through the influence of the cam disk 80, leaving the passage free for the upward movement of the gripper.

When the machine is started for another cycle of operations by actuating the treadle, the gripper is first closed, the stem of another tobacco leaf placed in its position being then severed, whereupon the feeding (booking) device is rendered operative. The leaf which was stripped before moves, its point first, downwards along the left side of the drum 36 (Fig. 1) and meets the new leaf about at 89, which new leaf is now stripped. This new leaf will then be brought immediately outside the first leaf and also in such a position relatively to the latter that the points at which the stripping commences coincide. In this manner the leaves are brought one after the other into the booking device so that they will be lying on top of each other between the band 19 and the drum 36 like the leaves of a book, as shown at 90 in Figs. 1 and 2.

The band 19 moves, when followed from the upper side of the break roller 37 and in the direction of the arrow 116 (Fig. 1), first between the rollers 40 and 45 and over the roller 91, then around the circumference of the drum 36 and about the roller 92 situated on the front side (the left hand side, Fig. 1) of the drum, from which roller 92 the band runs in an upward direction and over the rollers 93 and 94 above the drum, and, further, downwards on the right hand side and over the roller 95 and underneath the tension roller 96 and, finally, over the roller 97 back to the roller 37, the band being extended about the left hand side of the latter roller (Fig. 1). The rollers 37, 45, 91, 95 and 97 are mounted on shafts, both ends of which are attached to the lateral members 53 and 54 of the machine frame. The roller 94 is mounted on the shaft 52 and the roller 92 on the shaft 98 which is attached to the free ends of two arms 99 extending from the shaft 100 of the roller 93, the latter shaft being rotatably mounted in the frame members 53 and 54. The tension roller 96 serving to hold the band 19 taut in so far that space is provided between the band and the drum for a suitable number of leaves is mounted on the shaft 101 secured on two arms 102 which are rotatably mounted on the shaft 103 of the roller 95. The tension of the band is effected by the springs 104 which are adjustably attached to the cross brace 105.

The band 19 as well as the band 38 may be replaced by two or more bands running beside each other.

When a suitable number of leaves have been collected (booked) between the band 19 and the drum 36, they are fetched out in such a manner that the arms 99 together with the roller 92 are raised from their lower normal position, in which a spring 129 inserted between an arm 130 on the shaft 100 and the frame tends to keep them toward the position indicated with chain-dotted lines in Fig. 1, so that the bunch of leaves may be grasped by the hand when it moves past the opening provided through the raising operation. This raising is effected by the handle formed on the arm 106 (Fig. 3) being moved toward the left (Fig. 1), the motion being then transferred to the arms 99 through the pull rod 107 and the arm 108 attached to the free end of the shaft 100.

This method of collecting (booking) or removing of the leaves out of the machine is previously known per se, as is the arrangement for tensioning the band (or bands) 19. When the book has been removed, it is to be cut up so that two equal halves are obtained, if the leaves are to serve as wrappers or as binders of certain kinds. Again, if binders intended for binder pieces are considered, the book is to be cut up into pieces of a suitable size. Filler tobacco, also, is frequently required cut up. In order that these cutting operations shall take place with the least loss of time immediately on removing the book, a cutting device is mounted on the left hand side of the machine (Figs. 2 and 3), a fixed knife 109 being attached to the outside of the frame 54, said knife being adapted to cooperate with another knife 110 secured on the arm 112 pivotally mounted on the stud 111. The cutting or shearing is effected, as is readily understood (see Fig. 2), by the leaf edge (the book) being arranged on the fixed knife, whereupon the treadle 113 is actuated, said treadle being pivotally mounted at the bottom on the left hand side (Fig. 3) in the machine frame, and being connected through the link 114 with the arm 115 united with the arm 112.

What we claim is:—

1. In a machine for stripping the stem from a tobacco leaf, the combination of a device for gripping the leaf and feeding it into the machine, a gripper adapted to seize the stem and movable relatively to said leaf gripping device, said gripper comprising three shanks, the one of which is adapted to engage the leaf on the one side of the stem, while two others are adapted to engage the leaf on the opposite side of the stem, the one of these latter two shanks being pivotally and the other rigidly connected with the first named shank.

2. In a machine for stripping the stem from a tobacco leaf, the combination of a device for gripping the leaf and feeding it into the machine, a gripper adapted to seize the stem and movable relatively to said leaf gripping device, said gripper comprising three shanks, the one of which is adapted to engage the leaf on the one side of the stem, while two others are adapted to engage the leaf on the opposite side of the stem, the one of these latter two shanks being pivotally and the other rigidly connected with the first named shank, a holder for said gripper, said holder being rotatably arranged on a support movable from an upper stem receiving position to a lower stem delivering position, means for keeping the holder yieldingly in an upright position, that is, a position, in which the point of the gripper is directed upwardly, and means for rotating the holder with respect to the support.

3. In a machine for stripping the stem from a tobacco leaf, the combination of a device for gripping the leaf and feeding it into the machine, a gripper adapted to seize the stem and movable relatively to said leaf gripping device, said gripper comprising three shanks, the one of which is adapted to engage the leaf on the one side of the stem, while two others are adapted to engage the leaf on the opposite side of the stem, the one of these latter two shanks being pivotally and the other rigidly connected with the first named shank, a spring tending to close the gripper, means for opening the gripper and locking it in the open position, and a member for releasing said locking means and for starting the machine.

4. In a machine for stripping the stem from a tobacco leaf, the combination of a device for gripping the leaf and feeding it into the machine, a gripper, said gripper including shanks adapted to grip the stem between them and being movably connected to each other, a spring tending to close the gripper, means for opening the gripper and locking it in open position, a member in the form of lamina arranged to penetrate between the gripper shanks when the gripper has reached its stem delivering position.

5. In a machine for stripping the stem from a tobacco leaf, the combination of a device for gripping the leaf and feeding it into the machine, a gripper adapted to seize the stem and movable relatively to said leaf gripping device, said gripper having two shanks adapted to grip the stem between themselves and being pivotally connected to each other, one of said shanks being provided with a knife adapted to sever the stem transversally when closing the gripper, a member for starting the machine, and means whereby the gripper is closed, when said member is operated.

6. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, and a stem cleaning device for removing the remaining tobacco from the stem immediately after the stripping operation, said cleaning device comprising two cutting members, located on opposite sides respectively of the path of movement of the gripper, one of said cutting members consisting of a cutting wheel, being movable to and from the other cutting member.

7. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, and a stem cleaning device for removing the remaining tobacco from the stem immediately after the stripping operation, said stem cleaning device consisting of two cutter wheels located on opposite sides respectively of the path of movement of the gripper and being movable the one to and from the other.

8. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, and a stem cleaning device for removing the remaining tobacco from the stem immediately after the stripping operation, said stem cleaning device consisting of two cutter wheels located on opposite sides respectively of the path of movement of the gripper and being movable the one to and from the other, a driving shaft, means whereby the one cutter wheel is rotated from said driving shaft, means for transferring the rotation of the said cutter wheel to the other cutter wheel.

9. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, and a stem cleaning device for removing the remaining tobacco from the stem immediately after the stripping operation, said cleaning device comprising two cutting members, located on opposite sides respectively of the path of movement of the gripper, one of said cutting members consisting of a cutting wheel being movable to and from the other cutting member, the said cutter wheel being mounted in a pivoted arm, a driven shaft, and means whereby the said arm is given an oscillated movement by the rotation of said shaft.

10. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, and a stem cleaning device for removing the remaining tobacco from the stem immediately after the stripping operation, said cleaning device comprising two cutting members, located on opposite sides respectively of the path of movement of the gripper, one of said cutting members consisting of a cutting wheel, being movable to and from the other cutting member, the cutting members being provided at their outer edges with recesses for the passage of the stem.

11. In a device for stripping the stem from a tobacco leaf, the combination of a gripper adapted to seize the stem, means for gripping the leaf and moving it through the machine, said gripper being adapted to move relatively to the leaf gripping means so as to cause the stemming, the leaf gripping means consisting of two travelling belts, which are arranged to grip the leaf therebetween, said belt lines belonging to a booking device, a driving shaft, a coupling adapted in engaged position to transmit the rotation of the driving shaft onto the shaft of the booking drum, a coupling member adapted to normally keep the coupling in disengaged position, a second member adapted to be actuated by the operator to cause the gripper to perform its stripping movement, and means whereby said coupling member will bring the coupling into engaged position when the said second member is operated.

12. In a machine for stripping the stem from a tobacco leaf, the combination of a device for gripping the leaf and moving it into the machine, a gripper adapted to seize the stem of the leaf, means whereby the said device and said gripper are moved in relation to each other to cause the stem to be pulled from the leaf, said leaf gripping device consisting of travelling belts belonging to a booking device, means for cutting up the tobacco leaves in two equal halves, said means consisting of a shear-like cutting device, and a treadle for closing and opening the shanks of said cutting device.

In testimony whereof we affix our signatures.

FRIEDRICH WILHELM WEHMANN.
ERNST RUBEN DAHLSTRÖM.